United States Patent [19]
Dianov et al.

[11] Patent Number: 5,838,700
[45] Date of Patent: Nov. 17, 1998

[54] RAMAN FIBRE LASER, BRAGG FIBRE-OPTICAL GRATING AND METHOD FOR CHANGING THE REFRACTION INDEX IN GERMANIUM SILICATE GLASS

[75] Inventors: Evgeny Mikhailovich Dianov; Alexandr Mikhailovich Prokhorov, both of Moscow, Russian Federation

[73] Assignee: Nauchny Tsentr Volokonnoi Optiki Pri Institute Obschei Fiziki Rossiiskoi Akademii Nauk, Moscow, Russian Federation

[21] Appl. No.: 776,933
[22] PCT Filed: May 7, 1996
[86] PCT No.: PCT/RU96/00182
§ 371 Date: Feb. 11, 1997
§ 102(e) Date: Feb. 11, 1997
[87] PCT Pub. No.: WO97/05511
PCT Pub. Date: Feb. 13, 1997

[30] Foreign Application Priority Data

Jul. 28, 1995 [RU] Russian Federation ............ 95113514
Jun. 4, 1996 [RU] Russian Federation ............... 9611058

[51] Int. Cl.$^6$ ................................ H01S 3/30; H01S 3/00; G02B 6/34
[52] U.S. Cl. .................................. 372/6; 372/21; 372/102; 385/37; 385/122; 385/123; 385/141; 359/334; 359/341
[58] Field of Search .......................... 385/37, 123, 124, 385/125, 126, 127, 128, 141, 142, 122; 372/6, 21, 22, 23, 102, 109; 359/333, 334, 341, 345

[56] References Cited

U.S. PATENT DOCUMENTS

| | | | |
|---|---|---|---|
| 4,523,315 | 6/1985 | Stone ........................................... | 372/3 |
| 4,685,107 | 8/1987 | Kafka et al. ................................ | 372/6 |
| 4,725,110 | 2/1988 | Glenn et al. ........................ | 385/123 X |

(List continued on next page.)

FOREIGN PATENT DOCUMENTS

| | | | |
|---|---|---|---|
| 0248517A3 | 12/1987 | European Pat. Off. ............. | 385/37 X |
| 0651479A1 | 5/1995 | European Pat. Off. ............. | 385/37 X |
| 0189196A2 | 7/1996 | European Pat. Off. . | |

(List continued on next page.)

OTHER PUBLICATIONS

Hill et al. "Photosensitivity in Optical Fiber . . . ", Appl. Phys. Lett., vol. 32, No. 10, May 15, 1978, pp. 647–648.

(List continued on next page.)

*Primary Examiner*—Brian Healy
*Attorney, Agent, or Firm*—Evenson, McKeown, Edwards & Lenahan, P.L.L.C.

[57] ABSTRACT

The inventions relate to the sphere of the laser technology, the fibre and integrated optics, and are industrially applicable in elements of the fibre and waveguide optics made of germanium silicate glass, particularly in fibre-optical Bragg gratings and long-spacing gratings, scattering compensators, integrated optical waveguides, etc. The objective of simplification of Raman fibre lasers emitting in the wavelengths of 1.24 mc and 1.48 mc and enhancement of the radiation conversion efficiency in Raman scattering is attained. A laser emitting in the wavelength of 1.24 mc comprises a pumping source (1), a fibre light guide (2) containing $P_2O_5$ in the amount from 1 to 30 mole %, portions of a fibre light guide that contain $GeO_2$ in the amount from 11 to 39 mole % and are Bragg fibre-optical gratings (3) and (4), grating (3) forming a blank distributed reflector of an optical resonator for first Stokes component, and grating (4)—the output distributed reflector for the same resonator. First Stokes component is derived at the output. In a Raman fibre laser emitting in the wavelength of 1.48 mc second Stokes component is derived. A change in the refraction index in a portion of a fibre light guide (11) is achieved by directing to it a laser radiation (12) having a wavelength from 270 to 390 nm that passes through a protection polymer cladding of a fibre light guide (11). 3 independent claims, 23 dependent claims, 7 figures.

20 Claims, 3 Drawing Sheets

U.S. PATENT DOCUMENTS

| | | | |
|---|---|---|---|
| 5,042,897 | 8/1991 | Meltz et al. | 385/37 |
| 5,066,133 | 11/1991 | Brienza | 385/37 X |
| 5,104,209 | 4/1992 | Hill et al. | 385/37 X |
| 5,126,874 | 6/1992 | Alfano et al. | 359/240 |
| 5,237,576 | 8/1993 | DiGiovanni et al. | 372/6 |
| 5,305,335 | 4/1994 | Ball et al. | 372/6 |
| 5,317,576 | 5/1994 | Leonberger et al. | 372/6 |

FOREIGN PATENT DOCUMENTS

| | | | |
|---|---|---|---|
| 852073 | 9/1982 | U.S.S.R. | |
| WO93/18420 | 9/1993 | WIPO | 385/37 X |
| WO94/19713 | 9/1994 | WIPO | 385/37 X |

OTHER PUBLICATIONS

Grubb et al. "1.3 $\mu$m Cascaded Raman Amplifier in Germanosilicate Fibers", pp. 187–189.

Grubb et al. "High–Power 1.48 $\mu$m Cascaded Raman Laser in Germanosilicate Fibers", pp. 197–201.

Meltz et al. "Formation of Bragg Gratings . . . ", Optics Letters, vol. 14, No. 15, Aug. 1, 1989.

RAMAN FIBRE LASER, BRAGG FIBRE-OPTICAL GRATING AND METHOD FOR CHANGING THE REFRACTION INDEX IN GERMANIUM SILICATE GLASS

FIELD OF THE INVENTION

These inventions relate to the sphere of the laser technology, the fibre and integrated optics.

DESCRIPTION OF THE RELATED ART

A Raman fibre laser is known emitting wavelength $\lambda=1.48$ mc and comprising a fibre light guide based on $SiO2+GeO2$ as the active medium, an ytterbium laser emitting in the wavelength 1.117 mc as the pumping source, and 5 Bragg fibre-optical gratings as the distributed reflectors for wavelengths of 1.175 mc, 1.24 mc, 1.31 mc, 1.40 mc and 1.48 that form, respectively, 5 resonators for 1st, 2nd, 3d, 4th and 5th Stokes components of Raman (stimulated combinational) scattering [S. G. Grubb, T. Strasser, W. Y. Cheung, W. A. Reed, V. Mizhari, T. Erdogan, P. J. Lemaire, A. M. Vengsarkar, D. J. DiGiovanni, D. W. Peckham, B. H. Rockhey. High-Power 1.48 mc Cascaded Raman Laser in Germanium Silicate Fibres. Optical Amp. and Their Appl., Davos, USA, 15–17 Jun. 1995, p 197–1991].

The drawbacks of this laser is its complexity caused by the necessity to use five pairs of Bragg gratings and a relatively low efficiency of converting the radiation into 5th Stokes component. Furthermore, Bragg gratings do not have a sufficient depth of the refraction index modulation.

A Raman fibre laser emitting wavelength $\lambda=1.48$ mc, comprising a fibre light guide based on $SiO2+GeO2$ as the active medium, a solid body laser emitting in the wavelength of about 1 mc as the pumping source, and 6 Bragg fibre-optical gratings as the distributed reflectors for wavelengths of 1.117 mc, 1.175 mc, 1.24 mc, 1.31 mc, 1.40 mc and 1.48 mc that form, respectively, 5 resonators for 1st, 2nd, 3d, 4th, 5th and 6th Stokes components of Raman scattering, is known [S. G. Grubb, T. Strasser, W. Y. Cheung, W. A. Reed, V. Mizhari, T. Erdogan, P. J. Lemaire, A. M. Vengsarkar, D. J. DiGiovanni, D. W. Peckham, B. H. Rockhey. High-Power 1.48 mc Cascaded Raman Laser in Germanium Silicate Fibres. Optical Ampl. and Their Appl., Davos, USA, 15–17 Jun. 1995, p. 197–199].

The drawbacks of this laser is its complexity caused by the necessity to use six pairs of Bragg gratings, and a relatively low efficiency of converting the radiation into 5th Stokes component. Moreover, Bragg gratings have not a sufficient depth of the refraction index modulation.

The most proximate to the claimed lasers is the known Raman laser, comprising a fibre light guide based on $SiO2+GeO2$ as the active medium, a neodymium laser emitting in the wavelength of 1.06 mc as the pumping source, and 3 Bragg fibre-optical gratings as the distributed reflectors for wavelengths of 1.117 mc, 1.175 mc and 1.24 mc that form, respectively, 3 resonators for 1st, 2nd and 3d Stokes components of Raman scattering [S. G. Grubb, T. Erdogan, V. Mizhari, T. Strasser, W. Y. Cheung, W. A. Reed, P. J. Lemaire, A. E. Miller, S. C. Kosinski, G. Nykolak, P. C. Becker, D. W. Peckham. 1.3 mc Cascaded Raman Amplifier in Germanium Silicate Fibres. Optical Ampl. and Their Appl., Colorado, USA, 3–5 Aug. 1994, 187–190].

The drawbacks of this laser is its complexity caused by the necessity to use three pairs of Bragg gratings, and a relatively low efficiency of converting the radiation into 3d Stokes component.

An optical fibre is known that contains phosphorus to reduce the period of erbium ions relaxation and, as the result, the attenuation of the energy reverse transfer from erbium ions to ytterbium ions. [U.S. Pat. No. 5,225,925, dated Jun. 7, 1995, IPC H 01 S 3/16].

The drawback of this fibre is the impossibility to obtain radiation in the wavelengths of 1.24 mc and 1.48 owing to the presence of erbium ions in composition of the optical fibre.

A Bragg gaig is known that is used as a distributed reflector and implemented in the form of a portion of a fibre light guide, the core refraction index of which light guide having been modulated [U.S. Pat. No. 5,237,576, dated Jul. 08, 1995. IPC H 01 S 3/17].

The drawback of this grating is its low efficiency for the reason that the chemical composition of the optical fibre core is not optimised.

The method is known for changing the refraction index in an optical waveguide of germanium silicate glass, inclusive of the step of acting on a fibre light guide along the optical axis by a laser radiation in the wavelength $\lambda$ approximating 480 nm [K. O. Hill, Y. Fujii, D. C. Johnson and B. S. Kawasaki. Photosensitivity in optical fibre waveguides: application to reflection filter fabrication. Appl. Phys. Lett. Vol. 32910), 647–649 (1978)]. Here an argon laser having output power about 1 W and coherent wave about L=30 cm in length was used. In this method the two-photon interaction takes place, i.e. a change in the refraction index was achieved when the absorption band of 240 nm was excited. In a fibre light guide the interference of the incoming and reflected from the face beams occurred, whereby a grating was formed in a light guide.

The drawback of this method is a slight change of the refraction index $\Delta n$ (~10) and the impossibility to vary the spacing of a grating being formed.

The most proximate to the claimed method is the known method for changing the refraction index in an optical waveguide of germanium silicate glass, inclusive of the step of acting on a fibre light guide at an angle to the waveguide surfce by a laser radiation having wavelength approximating 240 nm [G. Meltz, W. W. Morey, W. H. Glen. Formation of Bragg gratings in optical fibres by a transverse holographic method. Opt. Lett. Vol. 14 (15), 823–825 (1989)]. In particular, in the said method, a change of the refraction index can be attained by action of radiation of second harmonic of an argon laser ($\lambda=244$ nm), fourth harmonic of a neodymium laser ($\lambda=266$ nm), an excimer laser based on KrF ($\lambda=248$ nm), or a dye laser ($\lambda=240$ nm). In the real practice an excimer laser is commonly used, which is the most unreliable, the most complex and expensive amongst the lasers mentioned above.

Radiation of second harmonic of an argon laser has a sufficiently great output power (W~0.2 W) and coherent length (L~5 cm), therefore using the same a grating in a fibre light guide is formed by the interference effect directing two beams at angle $\phi$ to the light guide surface. However the resulting effective length is not sufficient to form a grating in the case when the radiation is directed along the axis of a fibre light guide due to an high absorption, which is impermissible. Changing angle $\phi$ the spacing of the grating being formed can be varied. By a similar method a change of the refraction index can be achieved by action of radiation of fourth harmonic of a neodymium laser (W~1 W), coherent length of which is L~2–3 cm. Unfortunately, use of this laser is not efficient enough, as the radiation hits the edge of the band of absorption of germanium silicate glass, which is maximum 240 nm. A powerful radiation of an excimer laser (W>2 W) and second harmonic of a dye laser that hit the centre of the band of absorption of germanium silicate glass ensures a sufficiently great change of the refraction index ($\Delta \sim 10^{-3}$). But radiation emitted by these lasers has a little coherent length (L<1 mm), and that makes the use of the interference effect during formation of gratings rather difficult (the gratings are formed using special expensive and non-durable quartz masks, wherethrough the laser radiation is passed).

The main drawback of the said method is the use of a too short-wave laser radiation resulting in degradation of the optical elements (that increases as the output power grows) and additional stimulated losses in the optical elements and fibre light guides (in particular, a wide band of absorption of fibre light guides, being 290 nm at most), and this prevents formation of extended and several gratings. Such radiation is not allowed to be passed by polymer claddings of the standard fibre light guides, which makes the formation of gratings therein difficult (the light guides are to be relieved from the cladding). Moreover, the laser sources used in the prototype do not provide a sufficient reliability.

SUMMARY OF INVENTION

The claimed inventions are intended to simplify the Raman fibre lasers emitting in the wavelengths about 1.24 mc and 1.48 mc, and enhance the efficiency of the radiation conversion in Raman scattering.

The set objective is to be achieved as follows. In a known Raman fibre laser that comprises a fibre light guide based on SiO2 having at least one impurity dope as the active medium, a laser emitting in the wavelength range from 1.0 to 1.1 mc as the pumping source, and two Bragg gratings as the distributed reflectors for wavelength from 1.20 mc to 1.28 mc that form a resonator, an optical fibre contains P2O5 as the impurity dope, and the distributed reflectors form a resonator for first Stokes component, the optical fibre containing P2O5 in the amount from 1 to 30 mole %.

The set objective is also attained as follows. In a known Raman fibre laser that comprises a fibre light guide based on SiO2 having at least one impurity dope as the active medium, a laser emitting in the wavelength range from 1.0 to 1.1 mc as the pumping source, two Bragg gratings as the distributed reflectors for a wavelength range from 1.20 mc to 1.28 mc, and two Bragg gratings as the distributed reflectors for a wavelength range from 1.46 to 1.50 mc forming two resonators, characterised in that an optical fibre contains P2O5 as the impurity dope, and the distributed reflectors form resonators for first and second Stokes components, said optical fibre containing P2O5 in the amount ranging from 1 to 30 mole %.

Particularly, the fibre light guide can additionally contain F, N, Ge, Al, Ti and/or Bi for the purpose to improve its mechanical, optical and other properties as well as for varying the Stokes components wavelength within narrow limits, said additional impurity dope being contained in the amount ranging from $10^{-4}$ to 10 mole %.

Particularly, the pumping source can be implemented as a neodymium laser, ytterbium laser, semiconductor laser, or a fibre laser. Content of Nd in the active element in a neodymium laser can be in the amount from 0.1 to 2% by weight.

Particularly, the pumping source, comprising a neodymium laser, can additionally comprise a restructing member based on LiF:F2.

Particularly, the active member of a neodymium laser can be implemented on the basis of yttrium aluminate, lithium fluoride, yttrium-aluminium garnet, gadolinium-gallium garnet, gadolinium-calcium-magnesium-zirconium-gallium garnet or calcium-niobium-gallium garnet.

Particularly, in a fibre laser, length of the fibre light guide can be from 1 to 100 m.

Particularly, length of the fibre light guide can be from 1 to 10 km. Further, the fibre light guide can be implemented as having a step-type refraction index profile. In an alternative version, the fibre light guide core can be implemented as having the refraction index that changes over its cross section.

Particularly, difference between refraction indices of the core and the fibre light guide cladding can be not less than 10.

The set objective is further attained as follows. In a Bragg fibre grating implemented in the form of a portion of the fibre light guide based on SiO2 having at least one impurity dope, inclusive of GeO2, wherein the light guide core refraction index was modulated along its length, content of GeO2 is within the range from 11 to 39 mole %.

Particularly, the fibre light guide of Bragg grating for the purpose of improvement of the optical and mechanical properties can additionally contain F, N, P, Al, Ti and/or Bi as the impurity dope, content of said additional impurity dope can be within the range from 10 to 10 mole %.

Particularly, in Bragg grating, the periodic change of the modulated refraction index over the length of the fibre light guide can be within the range from $10^{-6}$ to $10^{-2}$.

Particularly, length of a portion of the fibre light guide can be within the range from 1 to 100 m.

Particularly, the reflection factor in a Bragg grating in the wavelength range from 1.20 to 1.28 mc can be from 95 to 100%.

Particularly, the reflection factor in a Bragg grating in the wavelength range from 1.20 to 1.28 mc can be from 10 to 80%.

Particularly, the reflection factor in a Bragg grating in the wavelength range from 1.46 to 1.50 mc can be from 95 to 100%.

Particularly, the reflection factor in a Bragg grating in the wavelength range from 1.46 to 1.56 mc can be from 10% to 80%.

The set objective is further attained as follows. In the known method for changing the refraction index in germanium silicate glass that comprises the step of acting on a glass by a laser radiation, this action is executed by radiation having wavelength within the range from 270 to 380 nm.

Particularly, a laser radiation can be directed along the optical axis of an element made of germanium silicate glass. In alternative versions, a laser radiation is directed at an angle to the element surface made of germanium silicate glass, or simultaneously along the optical axis and at an angle to the element surface.

Particularly, the element can be implemented as a portion of the fibre light/guide, a protection polymer cladding being applied thereon.

Particularly, said element can be implemented in the form of a plate.

Particularly, the action to be done on the glass can be executed by the ultraviolet radiation of an argon laser. In alternative elements, the action to be done on the glass is executed by third harmonic of radiation emitted by a neodymium laser, nitrogen laser, krypton laser or the ultraviolet radiation by a helium-cadmium laser.

The claimed two Raman fibre lasers, Bragg fibre optical grating used therein, and a method for changing the refraction index in germanium silicate glass used to form a Bragg grating are all linked by single laser of the invention and provide achievement of the said technical objective.

BRIEF DESCRIPTION OF DRAWINGS

The invention will be descried in conjunction with the accompanying drawings.

DESCRIPTION OF INVENTION EMBODIMENTS

Figure 1:
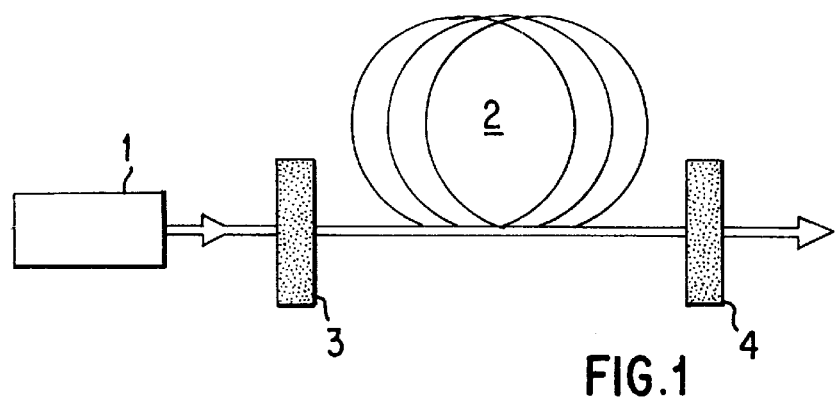
FIGS. 1 and 2 show versions of a Raman fibre laser emitting wavelengths of 1.24 mc and 1.48 mc, respectively.

A Raman laser emitting wavelength of 1.24 mc (FIG. 1) comprises a pumping source 1, a fibre light guide 2, portions of the fibre light guide being Bragg fibre-optical gratings 3 and 4, grating 3 forming a blank distributed reflector of an optical resonator for first Stokes component, and reflector 4 is the output distributed reflector for the same resonator. Type of the pumping source 1 and, if feasible, that of its restructuring, and length of wave of its radiation are selected on the basis of the necessity of fine tuning of a Raman fibre laser radiation wavelength.

Laser (FIG. 1) operates in the following manner. Pumping radiation from the source 1 is converted in the fibre light guide 2 owing to the forced combinational scattering. In the prototype, at the output, third Stokes component was derived; in the claimed laser (FIG. 1) derived is first Stokes component. Efficiency of conversion into first Stokes component is obviously higher than that into third one, and the conversion itself is simpler. To enhance the efficiency, in the laser (FIG. 1), as in the prototype, the resonance conversion during a multiple passage of the first Stokes component radiation through the resonator formed by reflectors (Bragg gratings) 3 and 4 is used. However, in the prototype, creation of optical resonators not only for first, but also for second and third Stokes components is required.

Figure 2:
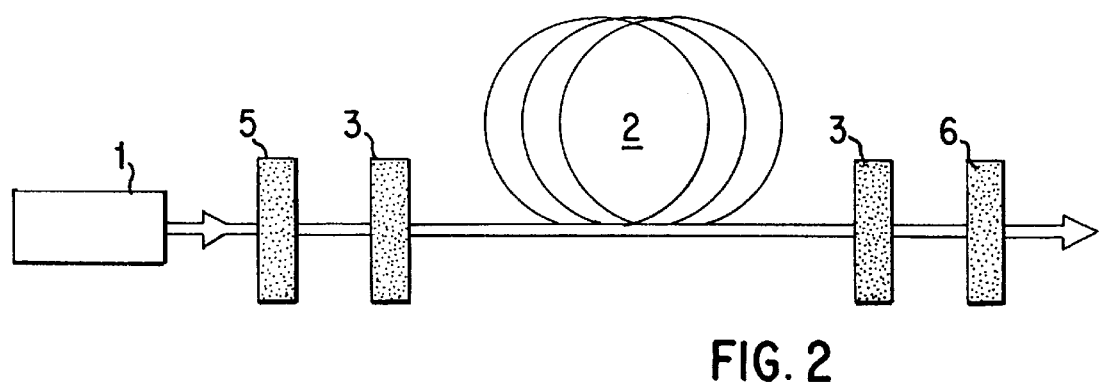

The Raman fibre laser for wavelength of 1.48 mc (FIG. 2) in comparison with the first version (FIG. 1) additionally comprises portions of the fibre waveguide that are Bragg fibre optical gratings 5 and 6, grating 5 forming a blank distributed reflector of the optical resonator for second Stokes component, and reflector 6—the output distributed reflector for the same resonator. Moreover, there is second grating 3 instead of grating 4. In this laser (FIG. 2) second Stokes component is derived, while in the most proximate analogue—sixth one. Efficiency of conversion into second Stokes component is obviously higher than that into sixth one, and the conversion itself is simpler. The analogue requires creation of optical resonators for first, second, third, fourth, fifth and sixth Stokes components, while in the claimed laser (FIG. 2)—only for first and second ones.

Figure 3:
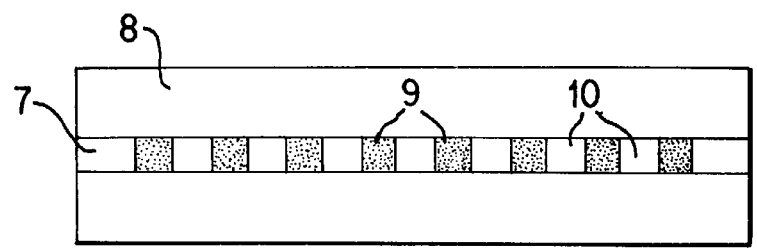
FIG. 3 schematically illustrates a Bragg fibre-optical grating.

The claimed Bragg fibre-optical grating (FIG. 3), as in the prototype, is a portion of the fibre light guide, comprising a core 7 and a cladding 8, in said core sections of a higher 9 and a normal (i.e. a lower than the average value) 10 refraction index are periodically alternated. This grating operates exactly in the same manner as in the prototype. The only distinction is that in the claimed grating (FIG. 3) a greater difference between the maximum and the minimum values of the refraction index (modulation depth) is provided owing to a new composition of the fibre light guide. Stokes components associated with the dopes were suppressed using an additional long-spacing grating or a special outputting grating introduced into the resonator.

Figure 5:
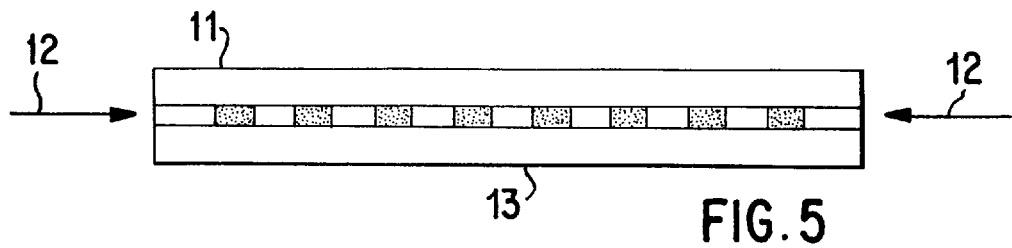
FIGS. 5, 6 and 7 schematically show versions of relative positions of a portion of a fibre light guide and a laser radiation beam during formation of a Bragg grating.
Figure 6:
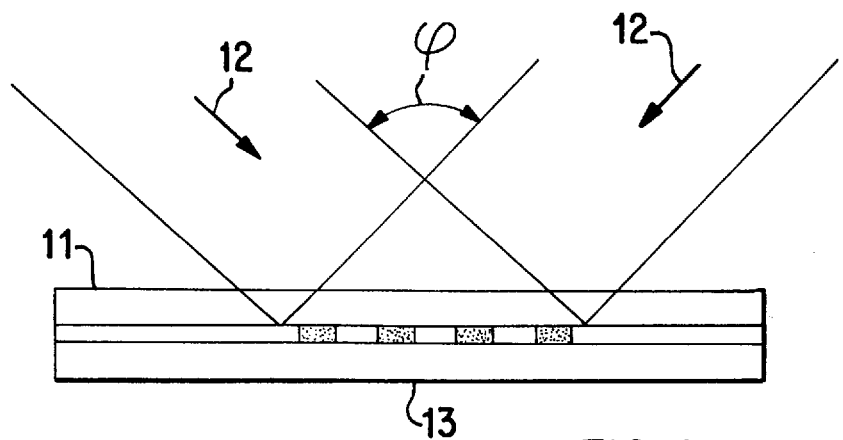
Figure 7:
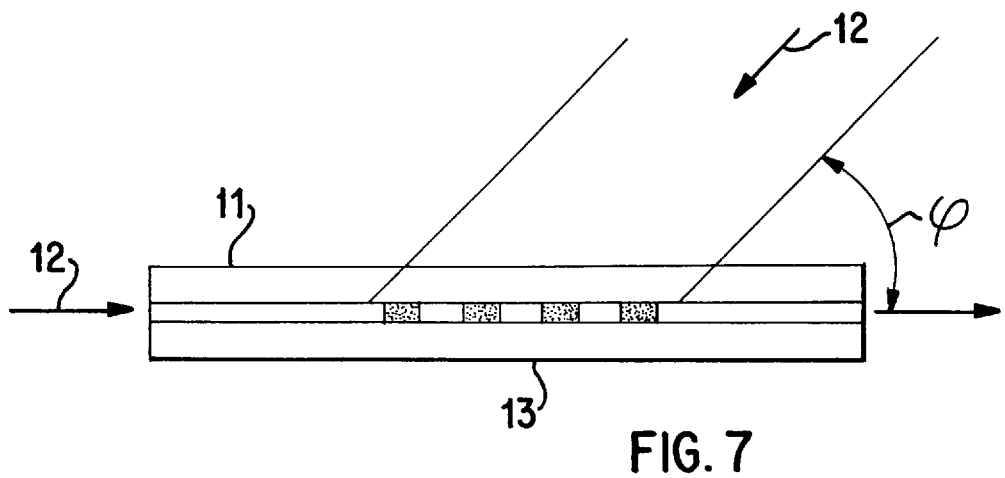

In the course of formation of a Bragg fibre-optical grating in case of the longitudinal geometry (FIG. 5), the laser radiation 11 is directed along the optical axis of the light guide 12; in case of the transverse geometry (FIG. 6), the laser radiation 11 is directed at angle $\phi$ to the surface of the light guide 12; and in case of the longitudinal-transverse geometry (FIG. 7), the laser radiation is directed simultaneously along the optical axis of the light guide 12 and at an angle to its surface. FIGS. 5, 6 and 7 show also an area 13 wherein a grating is formed (in FIG. 5 it occupies the entire portion of the fibre light guide 12). Direction of laser beams 11 in FIGS. 5, 6 and 7 are shown by arrows.

Figure 4:
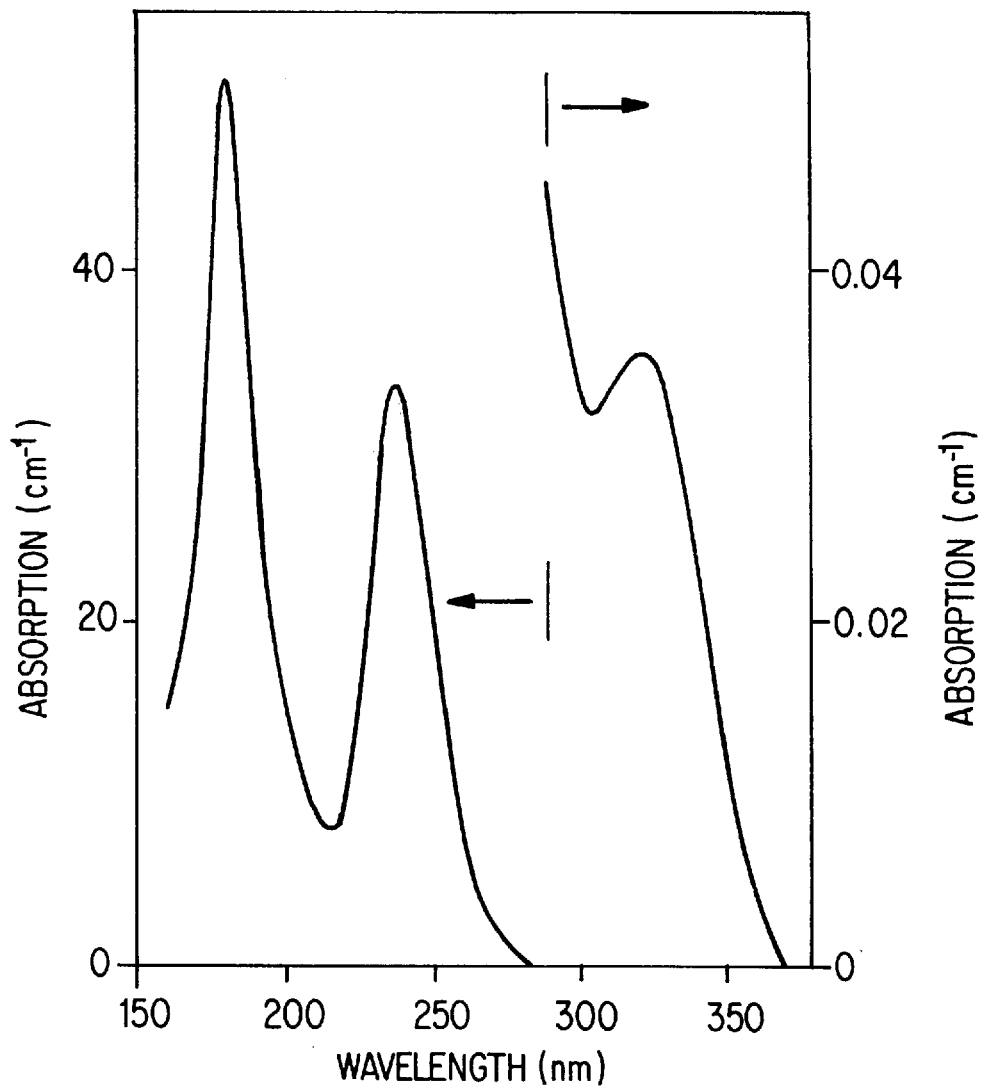
FIG. 4 shows the absorption specimen that is characteristic of germanium silicate glass.

Experiments have shown that the change of the refraction index of germanium silicate glass required for the industrial applicability can be provided by action of the laser radiation having a wavelength hitting not only the traditionally utilised bands of absorption near wavelengths of 180 and 240 nm, but also a weaker band of absorption having a wavelength approximating 330 nm (FIG. 4). Such radiation is passed through a protection polymer cladding of fibre light guides. For provision of a radiation wavelength within the range from 270 to 390 nm, lasers that are more reliable and durable than those of the prototype can be used. Particularly, it is clear that a neodymium laser is a more reliable radiation source, when third harmonic of its radiation is used (as in the claimed method), not fourth one (as in the prototype). The same is true for an argon laser: in the claimed method one of the main lines of radiation is used, while in the prototype—second harmonic.

Our experiment has demonstrated that a lesser absorption by germanium silicate glass in the said range in no way prevents creation of a desired change of the refraction index. Also it was discovered that at the maximum band of absorption near 290 nm, there are no stimulated losses at all. Slight losses in the said range allow to form gratings not only in the transverse (FIG. 6), but also in the longitudinal (FIG. 5) and the traverse-longitudinal (FIG. 7) geometries. In the longitudinal geometry (FIG. 5) the grating spacing is invariable, and in the transverse geometry (FIG. 6) and the longitudinal-transverse geometry (FIG. 7) it can be varied by changing $\phi$ angle.

In comparison with the prototype, a radiation with longer wavelengths (with a lesser energy of photons used in the claimed method does not result in a noticeable degradation of the optical elements.

A known fibre neodymium laser having output power of 1.5 W, with length of a fibre light guide of 30 m, core of which laser contains 0.5% by weight of Nd, was used as the pumping source 1. Bragg gratings 3, 4, 5 and 6 were implemented in the form of portions of the optical fibre 1 m long, the core 7 of which fibre contained 21 mole % of $GeO_2$, and its refraction index having been properly modulated, and the modulation depth reached $8\times10^{-4}$. The reflection factor of gratings 3 and 5 at wavelengths of 1.24 mc and 1.48 mc was, respectively, 99%, and the reflection factor of gratings 4 and 6 at waves 1.24 mc and 1.48 mc long was, respectively, 20%. The fibre light guide 2 was 10 m long, and its core contained 19 mole % of $P_2O_5$. The fibre light guide of the neodymium laser 1, the fibre light guide 2 and the fibre light guides of Bragg gratings 3, 4, 5 and 6 had standard transverse dimensions. These lght guides were fabricated according to the standard technology using the method of chemical precipitation from gaseous phase [Devyatykh G. G., Dianov E. M. Fibre Light Guides with Low Optical Losses. USSR Acad. of Sc. Courier, 1981, iss. 10, p. 54–66]. They were welded into an entity.

In the apparatus realising the claimed method one of the following lasers was used: 1) argon laser (ultraviolet radiation with wavelength of 333, 350 and/or 364 nm); 2) neodymium laser based on yttrium-aluminium garnet (third harmonic with wavelength of 355 nm); 3) nitrogen laser (with wavelength of 330 nm); 4) krypton laser (with wavelength of 350 nm); 5) helium-cadmium laser (ultraviolet radiation with wavelength of 330 and/or 350 nm). All these lasers are essentially more reliable and durable than the traditionally used KrF-based excimer one. Provision of a sufficiently powerful radiation of second harmonic of an argon laser having wavelength of 244 nm for the purpose to form gratings is more difficult than to obtain the radiation of its basic frequency. Similarly, it is more difficult to provide and use the radiation of fourth harmonic than its third harmonic. In the apparatus that would realise the claimed method, excimer lasers emitting in the wavelength of 308 nm, 351 nm, 352 nm can be used, but in this case realisation of all the benefits of the claimed method will not be carried out. Parameters of the used lasers and the geometry of the experiment are given in the Table below.

In particular, using the claimed method a long-spacing grating in a fibre light guide of germanium silicate glass was created. A fibre light guide was implemented both using the hydrogen atmosphere, and without utilisation of a processing by hydrogen. Gratings were formed both by the interference method (FIGS. 5, 6 and 7), and using one focused laser beam ("point-by-point" mode).

Testing of gratings having spacing of 200 mc fabricated utilising the claimed method demonstrated that they are as serviceable as those using the prototype, the refraction index change exceeding $\Delta n \sim 10^{-4}$. Moreover, the additional losses characteristic of the prototype were absent. When the germanium silicate glass obtained in the presence of hydrogen was used, an essential reduction of the stimulated losses was observed.

Testing of Raman fibre lasers (FIGS. 1 and 2) having Bragg gratings (FIG. 3) executed according to the claimed inventions demonstrated that the set objective is attained when they are used, i.e. simplification of Raman fibre lasers emitting in the wavelength of 1.24 mc and 1.48 mc is provided, and in Raman scattering the efficiency of the radiation conversion increases.

Industrial Applicability

The inventions are industrially applicable in devices for pumping devices in fibre amplifiers of the signals that are used in the broadband fibre-optical communication systems instead of the electronic repeaters. The claimed method can also be used for fabricating the fibre and waveguide optics elements made of germanium silicate glass, and in particular—the fibre-optical Bragg and long-spacing gratings, scattering compensators, integrated-optical waveguides, etc.

TABLE

Examples of Specific Embodiments

| Laser | λ mm | Mode | W | L | Geometry |
|---|---|---|---|---|---|
| Argon | 333–364 | cont | 5 | 30 | FIGS. 5 and 7 |
| Nd:Yag (3d harmonic) | 355 | pulse | 3 | 2 | FIG. 6 |
| Nitrogen | 337 | pulse | 0.5 | 0.1 | FIG. 6 |
| He—Cd | 325 | pulse | 0.07 | 50 | FIGS. 5 and 7 |
| Krypton | 338–356 | cont | 1 | 30 | FIG. 5 and 7 |
| Argon (2nd harmonic) | 244 | cont | 0.2 | 5 | FIG. 6 |
| Nd:YAG (4th harmonic) | 266 | pulse | 1 | 1 | FIG. 6 |
| Excimer KrF | 248 | pulse | 2 | >0.1 | FIG. 6 |
| Excimer XeCl | 308 | pulse | 2 | >0.1 | FIG. 6 |
| Excimer XeF | 352, 352 | pulse | 2 | >0.1 | FIG. 6 |

What is claimed is:

1. A Raman fiber laser, comprising a fiber light guide based on $SiO^2$ having at least one impurity dope as the active medium, a laser emitting in the wavelength range from 1.0 to 1.1 mc as the pumping source, and two Bragg gratings as the distributed reflectors for wavelength within the range from 1.20 to 1.28 mc forming a resonator, wherein an optical fiber contains $P^2O^5$ as the impurity dope, and the distributed reflectors form a resonator for first Stokes component, the optical fiber containing $P^2O^5$ in the amount from 1 to 30 mole %.

2. A Raman fiber laser, comprising a fiber light guide based on $SiO^2$ having at least one impurity dope as the active medium, a laser emitting in the wavelength range from 1.0 to 1.1 mc as the pumping source, two Bragg gratings as the distributed reflectors for wavelength within the range from 1.20 to 1.28 mc, and two Bragg gratings as the distributed reflectors for wavelength within the range from 1.46 to 1.50 mc forming two resonators, wherein the optical fiber contains $P^2O^5$ as the impurity dope, and the distributed reflectors form resonators for first and second Stokes components, the optical fiber containing $P^2O^5$ in the amount of from 1 to 30 mole %.

3. A laser as claimed in claim 1, wherein the fiber light guide additionally contains F, N, Ge, Al, Ti and/or Bi as the impurity dope, the additional impurity dope being contained in the amount from $10^{-3}$ to 10 mole %.

4. A laser as claimed in claim 1, wherein the pumping source is a neodymium laser, ytterbium laser, semiconductor laser, or a fiber laser.

5. A laser as claimed in claim 4, wherein the content of Nd in the active element of the neodymium laser is in the amount from 0.1 to 2% by weight.

6. A laser as claimed in claim 1, wherein the pumping source, comprising the neodymium laser, additionally contains a restructuring element based on $LiF:F_2$.

7. A laser as claimed in claim 1, wherein the active element of the neodymium laser is yttrium aluminate, lithium fluoride, yttrium-aluminum garnet, gadolinium-gallium garnet, gadolinium-calcium-magnesium-zirconium-gallium garnet, or calcium-niobium-gallium garnet.

8. A laser as claimed in claim 1, wherein the length of the fiber light guide is within the range from 1 to 100 m.

9. A laser as claimed in claim 1, wherein the fiber light guide is from 1 to 10 km long.

10. A laser as claimed in claim 1, wherein the fiber light guide has a step-type profile of the refraction index.

11. A laser as claimed in claim 1, wherein the core of the fiber light guide has a refraction index that varies across its cross section.

12. A laser as claimed in claim 1, wherein the difference between the refraction indices of the core and of the cladding of the fiber light guide is not less than $10^{-5}$.

13. A Bragg fiber grating in the form of a portion of the fiber light guide based on $SiO_2$ having at least one impurity dope, inclusive of $GeO_2$, the refraction index of the light guide core having been modulated along its length, wherein the content of $GeO_2$ is within the range from 11 to 39 mole %.

14. A grating as claimed in claim 13, wherein the fiber light guide additionally contains F, N, P, Al, Ti and/or Bi as the impurity dope, said additional impurity dope being contained in the amount from 10 to 39 mole %.

15. A grating as claimed in claim 13, wherein the periodic change of the light guide refraction index which has been modulated along the fiber is within the range from $10^{-6}$ to $10^{-2}$.

16. A grating as claimed in claim 13, wherein the length of the fiber light guide is within the range from 1 to 100 m.

17. A grating as claimed in claim 13, having a reflection factor within the wavelength range from 1.20 to 1.28 mc is from 95 to 100%.

18. A grating as claimed in claim 13, having a reflection factor within the wavelength range from 1.20 to 1.28 mc is from 10 to 80%.

19. A grating as claimed in claim 13, having a reflection factor within the wavelength range from 1.46 to 1.50 mc is from 95 to 100%.

20. A grating as claimed in claim 13, having a reflection factor within the wavelength range from 1.46 to 1.50 mc is from 10 to 80%.

* * * * *